March 22, 1966  J. W. BRUNDAGE  3,241,180
TIRE RIM ASSEMBLY FOR USE WITH POST INFLATORS
Original Filed May 23, 1960  5 Sheets-Sheet 2

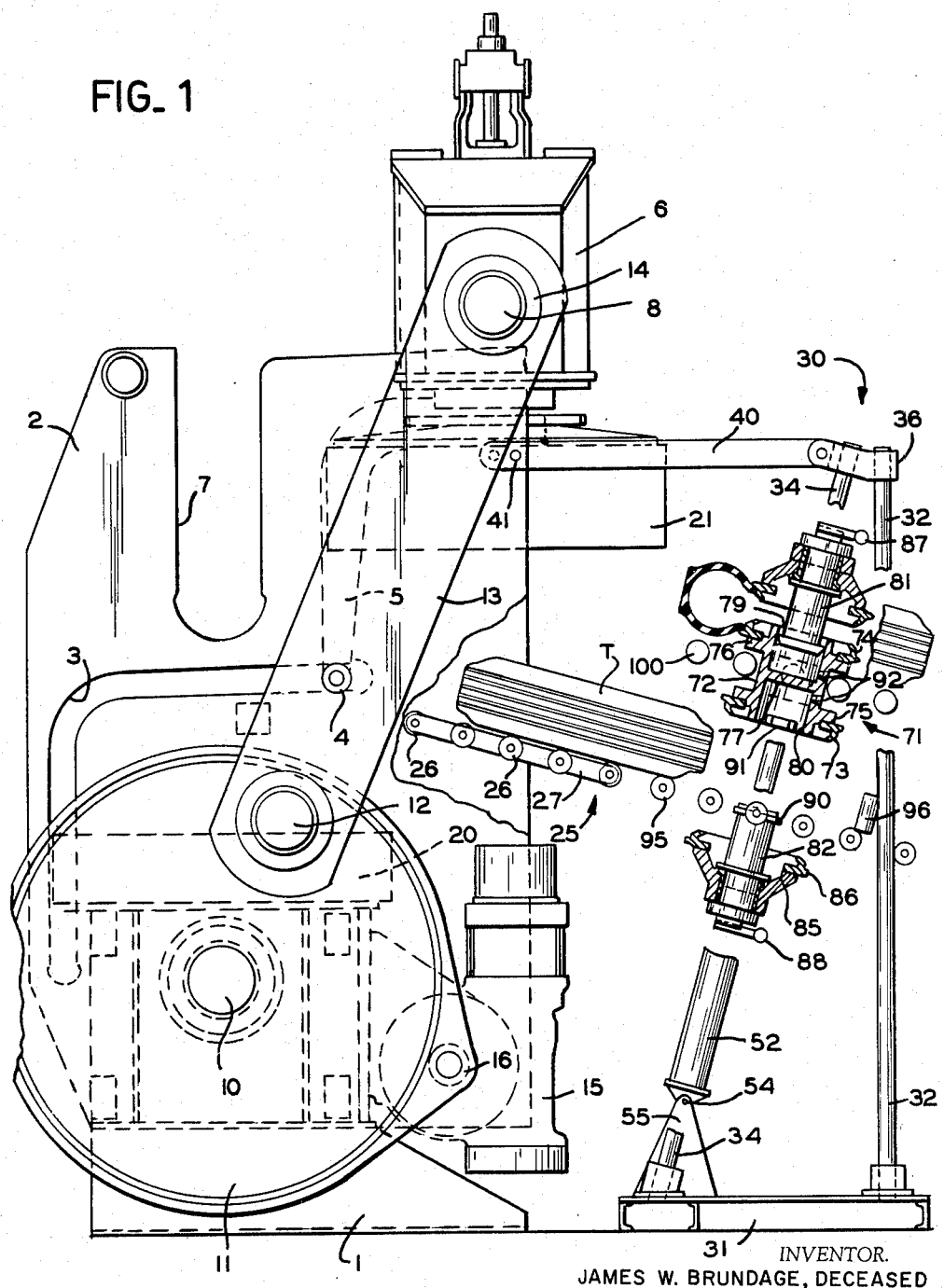

INVENTOR.
JAMES W. BRUNDAGE, DECEASED
By MAYME BRUNDAGE, EXECUTRIX

By Oberlin, Maky & Donnelly
ATTORNEYS

March 22, 1966      J. W. BRUNDAGE      3,241,180
TIRE RIM ASSEMBLY FOR USE WITH POST INFLATORS
Original Filed May 23, 1960      5 Sheets-Sheet 3
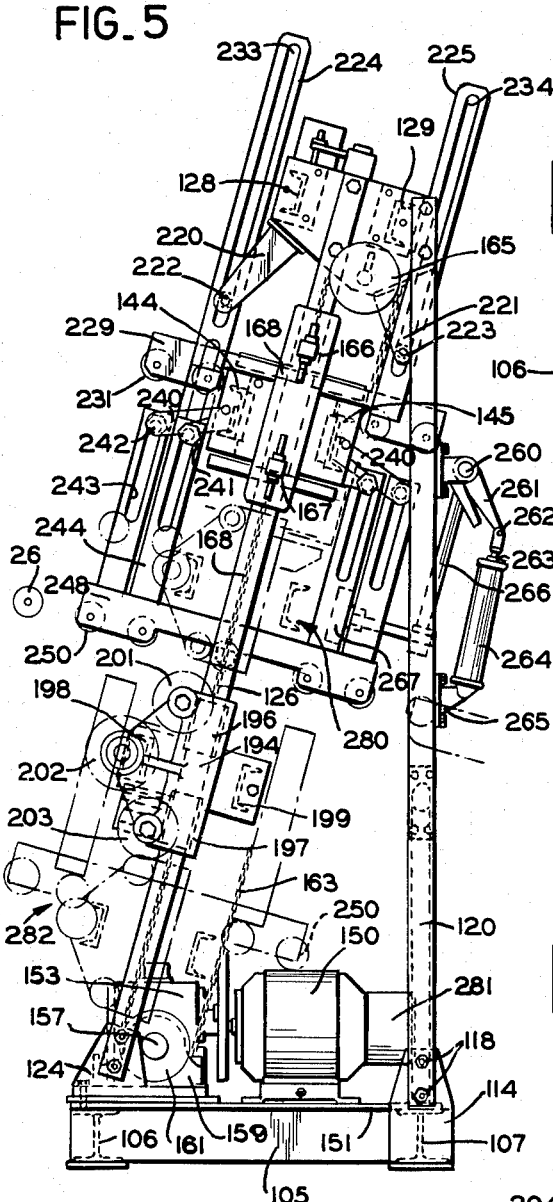
FIG. 5
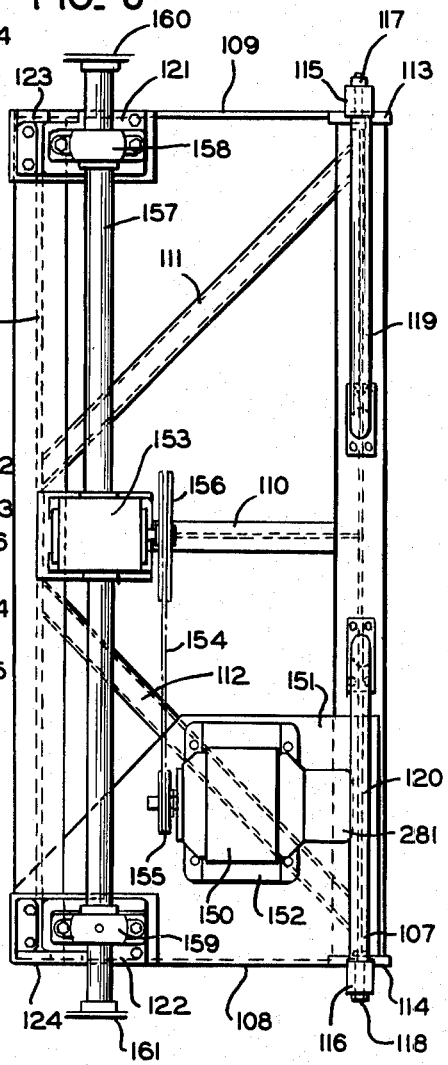
FIG. 8
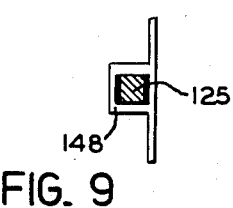
FIG. 9
FIG. 10
INVENTOR.
JAMES W. BRUNDAGE, DECEASED
By MAYME BRUNDAGE, EXECUTRIX
By *Oberlin, Maky & Donnelly*
ATTORNEYS March 22, 1966 J. W. BRUNDAGE 3,241,180
TIRE RIM ASSEMBLY FOR USE WITH POST INFLATORS
Original Filed May 23, 1960 5 Sheets-Sheet 4

*INVENTOR.*
JAMES W. BRUNDAGE, DECEASED
By MAYME BRUNDAGE, EXECUTRIX

By *Oberlin, Maky & Donnelly*
ATTORNEYS

March 22, 1966  J. W. BRUNDAGE  3,241,180
TIRE RIM ASSEMBLY FOR USE WITH POST INFLATORS
Original Filed May 23, 1960  5 Sheets-Sheet 5
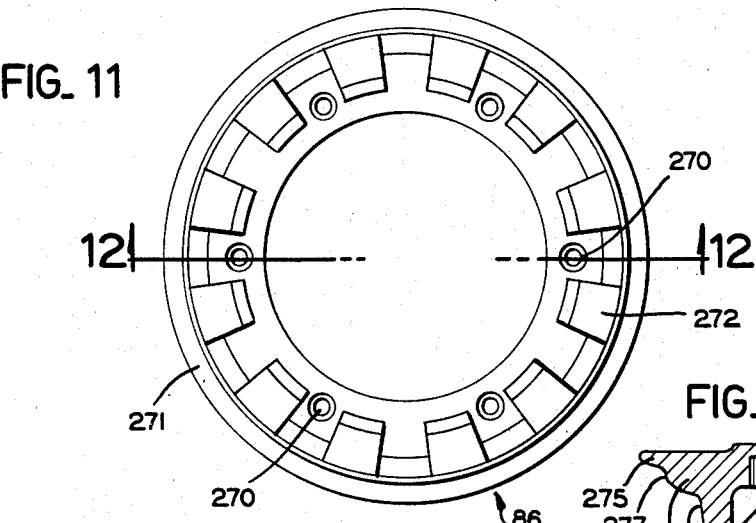
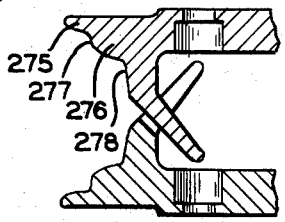
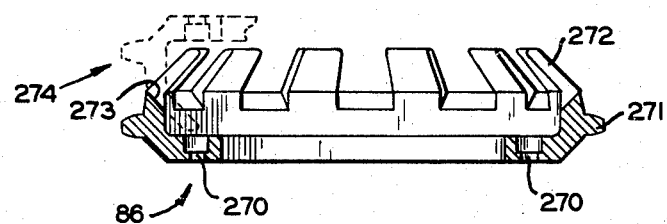
INVENTOR.
JAMES W. BRUNDAGE, DECEASED
By MAYME BRUNDAGE, EXECUTRIX
By Oberlin, Maky & Donnelly
ATTORNEYS

United States Patent Office 3,241,180
Patented Mar. 22, 1966

3,241,180
TIRE RIM ASSEMBLY FOR USE WITH POST INFLATORS
James W. Brundage, deceased, late of Akron, Ohio, by Mayme Brundage, executrix, Bath, Ohio, assignor to NRM Corporation, a corporation of Ohio
Original application May 23, 1960, Ser. No. 30,989, now Patent No. 3,170,187, dated Feb. 23, 1965. Divided and this application Apr. 2, 1963, Ser. No. 270,503
4 Claims. (Cl. 18—2)

This invention relates as indicated to a tire rim assembly for use with post inflators and more particularly to post inflation apparatus whereby tires using a fabric having shrinkage characteristics as, for example, nylon, Dacron, etc., may expediently be constructed. This application is a division of application Serial No. 30,989, filed May 23, 1960, now Patent No. 3,170,187, entitled "Tire Curing Press with Dual Post Inflators."

In the production of nylon or like fabric tires, when such tires are removed from the tire curing press molds, there is a tendency for such fabric to shrink when cooling. This shrinkage results in a distortion which can be so extreme that the tires in which it appears are not saleable. Moreover, such fabric as nylon cord has a drawing stretch of around 400% and tire manufacturers have found it necessary to subject the cord to additional stretch in order to prevent tires in which such cord is used from growing or increasing its size during service. Excessive growth, of course, causes tire failures due to cracking, ply separation, etc.

Reference may be had to the copending application of James W. Brundage and Edwin E. Mallory, Serial No. 732,531, filed May 2, 1958, entitled "Tire Handling and Curing Press, now Patent No. 3,065,499, assigned to National Rubber Machinery Company of Akron, Ohio, as well as the above referred to parent application, for a disclosure of post-inflation apparatus in which such nylon or like cord tires are cooled under tension after such tires have been stripped from the curing press.

In such apparatus, the tires are automatically rimmed up from a position on the discharge conveyor of the press. If the machines fail properly to rim up the tire, a scrap tire may result, either from direct damage to the tires or from failure to provide a proper rim-tire air seal.

In order to provide the latter, the tire bead engaging rims should be moved as close together as possible. The rims should also be provided with conical pilot surfaces to ensure that the tire will be properly centered on the rims on axial movement of the rim into engagement with the tire so that the bead of the tire will properly seat on the rim.

It is accordingly a principal object of the present invention to provide a tire rim assembly to facilitate the automatic production of nylon or like cord tires.

It is a further object to provide an improved post-inflation device for a tire curing press which will have greater reliability.

It is a still further object to provide a tire rim assembly for post inflation apparatus which will properly automatically center and seal the tires issuing from the tire curing press.

It is a yet further object to provide a tire rim assembly for post inflation apparatus which may conveniently and easily be installed on existing post inflation apparatus thereby greatly increasing the reliability and the productive capacity of the same.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

In said annexed drawings:

FIG. 1 is a fragmentary side elevational view partially in section disclosing one form of post-inflator affixed to a tire curing press in which the present invention may be employed;

FIG. 5 is a fragmentary side elevational view of another form of post-inflation device;

FIG. 8 is a fragmentary detail view of the base frame of the FIG. 5 embodiment;

FIG. 9 is a fragmentary detail sectional view of the left hand guide of FIG. 6;

FIG. 10 is a fragmentary detailed view taken substantially on the line 10—10 of FIG. 6 with parts removed for clarity of illustration;

FIG. 11 is a top plan view of the tire rim assembly or bead ring structure;

FIG. 12 is a sectional view taken on the line 12—12 of FIG. 11; and

FIG. 13 is a sectional view of an alternative embodiment of the bead ring structure whereby tires of different diameters may be accommodated.

Figure 3:
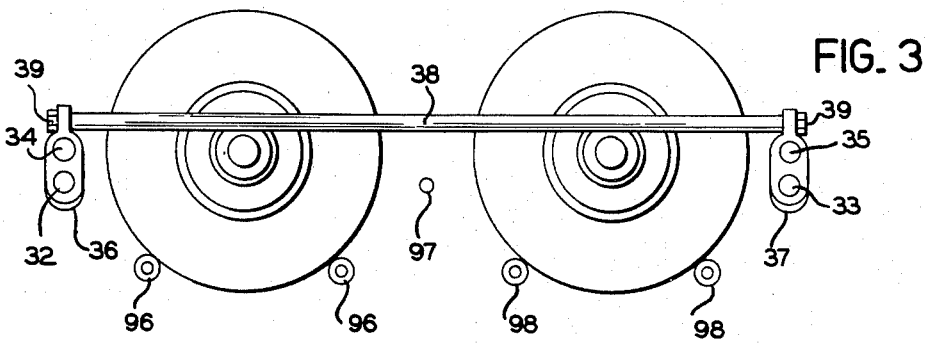
FIG. 3 is a fragmentary somewhat schematic top plan view of the apparatus shown in FIG. 2.

Referring now in detail to the drawings, the tire handling and curing mechanism herein disclosed will be discussed in detail under the following headings:

(1) The Tire Curing Press in General (FIG. 1)
(2) The FIG. 1 Embodiment of Post-Inflators
(3) The FIG. 5 Embodiment of Post-Inflators
(4) The Bead Ring Structures (FIGS. 11 and 12)
(5) Operation of FIG. 5 Embodiment.

It will, of course, be understood that items 1–3 and 5 above form per se no part of the present invention and are simply illustrative examples of apparatus with which the present invention may be employed.

THE TIRE CURING PRESS IN GENERAL (FIG. 1)

The press herein disclosed comprises a base 1 having upstanding cam plates 2 secured to the opposite sides thereof, each of which is formed with a first guide slot 3 for a guide roller 4 on a depending bracket 5 secured to the upper press head 6, such first slot 3 including a vertically extending portion and a generally horizontal portion as shown. Cam plate 2 is also formed with a second guides slot 7 including a vertically extending portion and a generally horizontally extending top portion, such top portion having the top of the slot omitted. The guide slot 7 in each plate 2 at the sides of the press accommodates shafts 8 for movement through a generally L-shaped path corresponding to the shape of the guide slot 7.

Journalled in each end of the base 1 is a stub shaft 10 of a bull gear crank 11 and pivotally secured to the crank pin 12 thereof is the lower end of a crank link 13, the upper end of such link 13 being pivotally secured on the shaft 8 at the respective end of the press head 6. As shown, the press head 6 extends between the end plates 2 and preferably each shaft 8 thereof has a guide bushing 14 thereon which is in close sliding fit to the vertical portion of slot 7.

The bull gear cranks 11 are driven by electric motor driven gear reducers 15, the output shafts of which each have a pinion 16 in mesh with the teeth of the corresponding bull gear crank.

The press is shown in its FIG. 1 position as opened with the crank pins 12 being near the top and the links 13 disposed in an inclined position. The rollers 4 which are carried by the brackets 5 depending from the press head 6 are disposed adjacent the ends of the horizontal portions of the guide slots 3 and similarly, the shafts 8 of the press head 6 are disposed adjacent the ends of the horizontal top portions of the guide slots 7.

The base 1 of the press carries a pair of bottom mold sections 20 in side-by-side relationship, each of which, as well-known in the art, is formed with an annular cavity which constitutes the molding surfaces for the bottom bead, the bottom side wall, and the lower half of the tread, or skid portion of a tire. Each mold section 20 is provided with a toe ring over which the bottom bead of a pulley band carcass is adapted to be positioned and, of course, each mold section has a heating platen thereunder.

The press head 6 likewise carries a pair of side-by-side downwardly facing top mold sections 21 which, like the bottom mold sections 20, each define an annular cavity providing the molding surfaces of the top bead, the top side wall, and the upper half of the tread, or skid portion of the tire. Again, a heating platen is interposed between each top mold section 21 and the press head 6.

When the press is in closed position, the top and bottom mold sections 20 and 21 are in mating engagement thereby forming a tire shaped cavity therebetween in which a tire T is adapted to be cured to final shape by circulation of curing medium such as hot water or steam under pressure through the interior of the tire carcass. When the press is in its closed position, the crank pins 12 will be at the bottom with the links 13 disposed in a generally vertical position. The rollers 4 which are carried by the brackets 5 depending from the press head will be disposed adjacent the bottoms of the vertical portions of the guide slots 3 and similarly the shafts 8 of the press head 6 will be disposed adjacent the bottoms of the vertically disposed portions of the guide slots 7. Thus the bull gear cranks 11 will be rotated in a counterclockwise direction to position the pins 12 to move the head to its closed position. It can readily be seen that the roller 4 within the slot 3 which is attached by means of bracket 5 to the head 6 will maintain the upper mold section 21 always substantially parallel to the lower mold section 20.

It is noted that when the press is in its open position shown, the space above the bottom mold section 20 is unobstructed so that a pulley-band carcass may easily be positioned from overhead and in upright position around the toe ring of the bottom mold section. Also, in the open position, the top mold section 21 is laterally offset from the bottom mold section 20 such that the cured tire may be dropped therefrom by a convenient stripping mechanism to be placed upon a discharge path defined by conveyor 25 to be moved from the press. Accordingly, the unloading conveyor 25 comprises a downwardly and rearwardly tilted platform carrying anti-friction rollers 26 which may be supported by bars 27 pinned to the respective end plates of the tire press.

The hereinabove described tire press is a Slide-Back Autoform vulcanizer which is manufactured and sold by National Rubber Machinery Company of Akron, Ohio, to tire manufacturers for producing tires uniformly in great quantity. Reference may be had to the above-mentioned copending application of Brundage et al. for a more complete description of this tire press.

When the tire T leaves the vulcanizing press, it is yet in highly heated condition and as a result, in the case of nylon cord or like tires, it has been found desirable to cool the cured tire while the cords thereof are under tension. Of course, the most economical way to cool such cured tires is to expose the same to ambient or room air, such air being at a temperature substantially less than the temperature of the vulcanized tire. In order properly to cool such tire, it has been found that a length of time substantially equal to two cycles of the curing press is required to reduce the temperature of the tire to such room temperature wherein the cords thereof may be released from the tension required during such cooling operation.

Thus, there is provided a dual post inflation device for use with such tire press, one illustrated form of which may be seen in FIG. 1 generally shown at 30.

DUAL POST INFLATION DEVICE (FIG. 1 EMBODIMENT)

The FIG. 1 dual post inflation device may comprise a base 31 having four upright support members 32, 33, 34 and 35 supported thereon with the upright members 32 and 33 extending normal to such base 31 and the upright members 34 and 35 extending inclined thereto but normal to the path of conveyor 25. The upright members are secured together at the tops thereof as seen more clearly in FIG. 3 with the members 32 and 34 being held by bracket member 36 and the members 33 and 35 being held by bracket member 37. Each such bracket member is provided with a forwardly extending portion through which a transverse frame member 38 is secured as by nuts 39. Further brace members 40 may be provided secured to each side of the supporting structure and also secured as shown at 41 to each of the side plates 2 of the tire curing press. It can now be seen that the FIG. 1 embodiment of such dual post inflators is firmly secured to the rear of the machine to accommodate tires coming from the press in a manner now to be described.

Figures 2, 4:
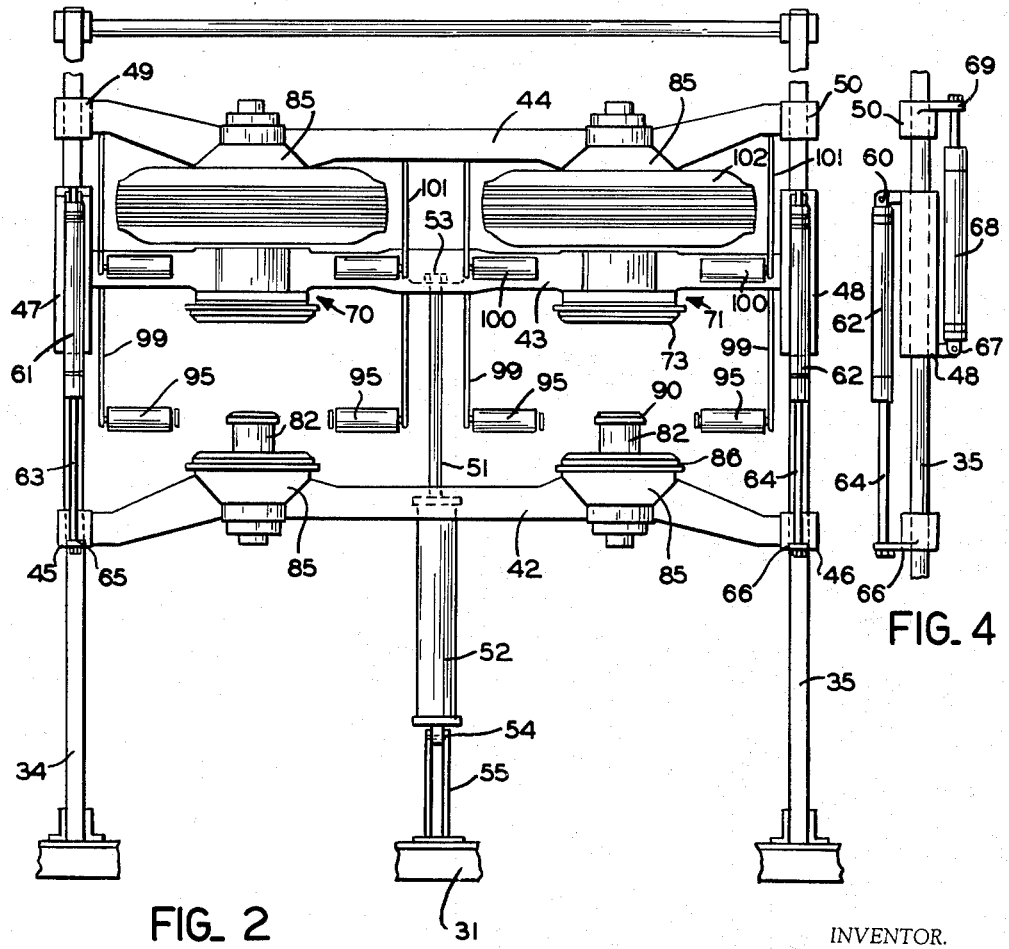
FIG. 2 is a fragmentary end elevational view of such post-inflator as seen from the right along the conveyor in FIG. 1.
FIG. 4 is a fragmentary side elevational view of the apparatus of FIG. 2 illustrating the position of the various actuating cylinders.

Each of the inclined vertical support members 34 and 35 constitute guides for the vertical movement of three transverse frame members 42, 43 and 44 extending therebetween as shown more clearly in FIG. 2. The opposite ends of the transverse members 42 are provided with bearings surrounding and enclosing the uprights 34 and 35 as shown at 45 and 46 whereby such may move readily along the uprights 34 and 35. The opposite ends of the transverse member 43 are also provided with enlarged portions 47 and 48 surrounding the uprights 34 and 35 and are provided with bearings in the conventional manner to facilitate the vertical movement of such member 43 along the guides 34 and 35. Likewise, the top transverse member 44 is also provided with enlarged end portions 49 and 50 having suitable bearings therein to facilitate the movement of such transverse member along the guides 34 and 35.

The middle or intermediate transverse member 43 has the rod 51 of piston-cylinder assembly 52 affixed thereto as shown at 53. The blind end of the piston-cylinder assembly is mounted as shown at 54 on upstanding ears 55 supported on base 31. Such piston-cylinder assembly 52 is positioned intermediate the guides 34 and 35 and extends generally parallel thereto. For this reason, it can be seen that the central transverse member 43 is mounted for reciprocation along the guides 34 and 35 by means of the piston-cylinder assembly 52.

As shown more clearly in FIG. 4 on opposite ends of the elongated enlarged portions 47 and 48, then is pivotally mounted pairs of piston-cylinder assemblies to move the respective transverse frame members 42 and 44 with respect to the intermediate or central transverse frame member 43. Mounted on the back of each of the enlarged portions 47 and 48 as at 60 are two piston-cylinder assemblies 61 and 62, the rods 63 and 64 of which are secured to extensions 65 and 66 on the enlarged end portions 45 and 46 respectively of the lower transverse member 42. Accordingly, it will be seen that the transverse frame member 42 is mounted by means of the piston-cylinder assemblies 61 and 62 for reciprocation along the guides 34 and 35 with respect to the intermediate transverse frame member 43.

Pivotally mounted on the bottom of the enlarged portions 47 and 48 as at 67 are a pair of similar piston-cylinder assemblies 68, the rods of which are fixed to the extensions 69 on the enlarged end portions 49 and 50 of the top transverse frame member 44. In the same manner, the top transverse frame member 44 is mounted on the guides 34 and 35 for reciprocation toward and away from the intermediate transverse frame member 43 by means of such piston-cylinder assemblies 68. It can now be seen that the entire assembly is mounted for movement along the guides 34 and 35 by means of the main piston-cylinder assembly 52 and that the other transverse frame members 42 and 44 are mounted for movement with respect to the intermediate frame member 43 by means of the separate pairs of piston-cylinder assemblies mounted on the enlarged portions 47 and 48 of such intermediate frame member. It will, of course, be understood that the transverse frame member 42 may either be apertured or bowed slightly to by-pass the piston-cylinder assembly 52 such that the transverse frame member will have complete freedom of movement therepast.

Mounted on the central transverse frame member 43 are oppositely facing pairs of rim inflating assemblies cooperating with similar rim inflating assemblies on the transverse frame members 42 and 44 to seal the tires as they come from the curing press such that they may be inflated with air under pressure to maintain the nylon or like cords therein under tension during the cooling thereof at ambient temperature. As shown perhaps more clearly in FIG. 1, each of the tire confining structures 70 and 71 mounted on the transverse frame member 43 comprises a tubular-shaped member 72 having annular bead rings 73 and 74 oppositely facing on respective flanges 75 and 76 to engage the tire in a manner hereinafter described. A central web 77 separates the two recesses or cavities 79 and 80, the oppositely facing recesses 79 and 80 accommodating, respectively, projecting portions 81 and 82 mounted on the rim structures positioned on the top frame member 44 and the bottom frame member 42 respectively. Each of these structures includes bell-shaped supports 85 upon which are positioned bead rings 86 substantially identical in form to the bead rings 73 and 74 mounted on the interior or central rim structures. Each of the projections 81 and 82 are mounted on the respective supporting structures of the transverse frame members for rotational movement by piston-cylinder assemblies 87 and 88 which may drive rack and pinions or other suitable mechanisms whereby the extensions 81 and 82 may be rotated to provide a bayonet lock when they are inserted within the respective cavities 79 and 80 of the rim structures on the central transverse member 43. As shown, each of the central projections 81 and 82 is provided with an overhanging annular lip portion 90 which is slotted such that projections 91 within the recesses in the rim structures on the transverse central frame member will lock behind such lip 90 when the projection is rotated by the piston-cylinder assembly 88. Thus a bayonet type of lock is provided once the opposed bead lip structures are brought into tire engaging position.

The center projections 81 and 82 are provided with an air seal with their respective bell-shape supports such that when the bead rings are brought into tire engagement, the interior of the tire will be airtight so that it can be pressurized by air conduits connected, for example, as at 92.

As shown in FIG. 1, the conveyor or rollers 95 constitute an extension of the conveyor rollers 26 of the inclined conveyor 25 such that the tire T will roll directly from such conveyor 25 onto the rollers 95 to be brought to a stop by abutments 96 positioned in the path of the tire. These abutments may be pivoted about the inclined supports and an intermediate pivot 97 also supporting abutments 98 for the other tire coming from the dual press. When the tires are halted in their inclined downwardly directed path by such abutments, they will be generally aligned with the separated bead rings 73 and 86. The rollers 95 are in reality opposed pairs of such rollers mounted on depending brackets 99 from the central transverse frame member 43 and, of course, are thus movable therewith. Once the heated tires are brought into the proper position against the abutments 96 and 98, the piston-cylinder assemblies 61 and 62 will retract the piston rods 63 and 64 to draw the transverse frame member 42 upwardly to lift the tires off the conveyor rollers 95 and clamp the tires between the bead rings 73 and 86. Actuation of the piston-cylinder assembly 88 will then rotate the projections 82 to lock such bead rings together providing an airtight enclosure for the tires. Such tires T are then inflated to the desired pressure to keep the tire cords under the desired tension. The tires may be inflated to an internal pressure of approximately 30 pounds and this pressure retained until the temperature of the tire falls below the temperature at which the nylon or like cords will heat shrink, such being approximately 250° F. However, since the time required for this cooling at ambient temperature is considerably more than the period of time of one cycle of the tire press, there is provided a means to retain such tires under tension without slowing the productive capacity of the tire press.

Mounted on the top transverse frame member 44 are conveyor rollers 100 identical in form to the conveyor rollers 95 mounted on the intermediate transverse frame brackets 11 in a similar fashion to the conveyor rollers member, these rollers 100 being mounted by depending 95. Once a hot tire has been secured between the bead rims 86 and 73, the entire mechanism will be moved downwardly by actuation of the piston-cylinder assembly 52 to retract the rod 51 to bring the tire mechanism downwardly until the bead ring 74 shown in FIG. 1 is in the position formerly occupied by the bead ring 86. In this position, the tire 102 which has been cooling during the previous cycle of the tire press will now be in a position to be removed and again, placed upon the inclined conveyor to be transferred to storage, etc. Shortly before the end of the next cycle of the tire curing press, the piston-cylinder assemblies 68 will be actuated to raise the top transverse frame member 44 after the tire 102 has been deflated then to position the conveyor rollers 100 upwardly in the position that the rollers 95 are shown in FIG. 2. This will then clear or strip the tire from the bead ring 74 and once the rollers 100 are in a position to constitute a continuation of the conveyor 25, the tire 102 will roll clear of the post-inflation device. Once the tire is removed by the conveyor, the stops 96 and 98 will again be positioned to stop the hot tires coming from the tire press at the end of the next cycle. Once the hot tires are stopped, retraction of the piston-cylinder assemblies 68 will bring the top transverse frame member downwardly and actuation of the piston-cylinder assemblies 87 will rotate the projections to provide the bayonet lock to confine or provide an airtight chamber for the hot tires. Once these tires are placed under pressure they will then be elevated by extension of the rod 51 of the piston-cylinder assembly 52 bringing the lower tires again to the conveyor position where such will be discharged prior to the completion of the next press cycle by actuation of the piston-cylinder assemblies 61 and 62. It can thus be seen that this form of dual post inflation device provides a cooling period for the hot tires coming from the press which will be substantially twice that required for the vulcanizing operation of the press itself.

FIGURE 5 EMBODIMENT (FIGS. 5 THROUGH 10)

Referring now to the form of post inflation mechanism illustrated in FIGS. 5 through 9 inclusive, and referring first to FIG. 5, it will be seen that such embodiment is mounted on a base 105 having transverse structural members 106 and 107 interconnected by side plates 108 and 109 as well as an intermediate member 110 and diagonal braces 111 and 112 (see particularly FIG. 8). Mounted at the two rear corners of the frame 105 are two upstanding plates 113 and 114 to which are secured upstanding vertical support members 115 and 116 as by the nut and bolt assemblies shown at 117 and 118 respectively. Diagonal supports 119 and 120 are employed to brace such upright members 115 and 116 rigidly vertically to support the same.

At the front corners of the base frame 105, there is provided two bed plate members 121 and 122 supported on plates on the corners of the frame, each having upstanding gusset plate-like portions 123 and 124 to which inclined vertical guide members 125 and 126 are secured. (Note FIG. 6.) A top transverse frame member 127 composed of two channel members 128 and 129 is firmly secured as by the nut and bolt assemblies shown to each of the upstanding vertical members 125, 126 and 115, 116. Thus a rigid A-like frame is provided on the base structure which firmly supports the component parts of the dual post inflator for movement along the guides 125 and 126.

Secured to the top transverse frame member 128 are two tire inflating rim devices 130 and 131 which are identical in form and quite similar to the inflating rim devices 85 mounted on the top transverse frame member 44 of the FIG. 1 embodiment of the invention. Each of the inflating rim devices is mounted on the top transverse frame member 127 by means of downwardly projecting rods 132 which may, if desired, be surrounded by compression springs 133 whereby such inflating rim devices may be resiliently moved toward the top transverse frame member for a limited distance. Each device also includes a center rotatable shaft 134 connected to a linkage 135 actuated by the rod 136 of piston-cylinder assembly 137, the blind end of such assembly being connected as at 138 to the top transverse frame assembly 127. Thus the cylinder assembly 137 may be actuated to rotate central projections 139 within each of the inflating rim assemblies whereby a bayonet lock may be provided as shown at 140 with the opposed inflating rim assemblies 141 and 142 mounted on an intermediate movable transverse frame member 143. Each of the inflating rim assemblies includes an annular bead-engaging structure identical in form to the bead-engaging structures shown in the FIG. 1 embodiment which will hereinafter be more fully described.

The inclined guide 125 is of square cross section and the inclined guide 126 is of circular cross section and both provide guide means for the reciprocation therealong of the intermediate transverse frame member 143.

Such intermediate transverse frame member may include a pair of transversely extending structural frame members 144 and 145 in a manner similar to the top transverse frame member. As seen more particularly in FIGS. 5 and 6, the right hand side of such transverse member 143 is elongated and enlarged to provide a bearing 146, which may, for example, be a bronze bushing at one end and a similar bearing 147 at the opposite end. Thus, the transverse frame member is precluded from canting on the guide 126 and can readily be moved therealong. The opposite end of such transverse frame member 143 is enlarged as shown at 148 to enclose the square sectional guide 125 such that the tire frame may be slid therealong. (Also note (FIG. 9.)

In order to impart movement to such transverse frame member along the guides 125 and 126, there is provided the drive motor 150 mounted on a plate 151 on the base frame 105, such plate including a slide base 152 along which the motor may be adjustably positioned.

The motor 150 drives a speed reduces 153 of the cone shaft type, reducing the speed of the motor in approximately a 50 to 1 ratio. The drive described in accomplished by belt 154 and sheaves 155 and 156 mounted on the motor and speed reducer respectively. The slide 152 thus maintains adjustably the proper tension on the belt 154 in a conventional manner.

The speed reducer drives transverse shaft 157 mounted in pillow blocks 158 and 159 secured respectively to the bed plates 121 and 122. Mounted on the opposite ends of the shaft 157 are sheaves 160 and 161 driving respectively chains 162 and 163. Such chains are respectively trained around sheaves 164 and 165 mounted on the top frame structure of the dual post inflation device. The opposite ends of the chain 163 are adjustably secured as shown at 166 and 167 to the elongated guide housing 168 of the transverse frame member 143. The chain 162 is adjustably secured as at 169 and 170 to the member 148 of transverse frame 143 enclosing the guide 125. Thus, depending upon the direction of rotation of the motor 150, the transverse frame member will be caused to move upwardly or downwardly along the guide 126. By the adjustment means 169, 170 and 166, 167, the tension of both chains 162 and 163 can closely be controlled. It can now be seen that the transverse intermediate frame member 143 is mounted for movement along the guides 125 and 126 by the chain drive driven by motor 150.

In a manner similar to the intermediate transverse frame member 43 of the FIG. 1 embodiment, the transverse frame member 143 includes two tire rim inflating assemblies 180 and 181 which are substantially identical in form to the assemblies 70 and 71 of the FIG. 1 embodiment. Such assemblies are, however, secured directly between the structural frame members 144 and 145 as by bolts shown at 182. Also, air union couplings may be provided at 183 and 184 connecting such inflating structures to a source of air pressure as through, for example, flexible hoses. The downwardly facing inflating rim structures 185 and 186 cooperate with upwardly facing inflating rim structures 187 and 188 mounted on lower transverse frame member 189. These structures are essentially identical in form to the structures 85 on the lower transverse frame member 42 in the FIG. 1 embodiment and include center projections 190 and 191 which may be rotated by a linkage 192 actuated by piston-cylinder assembly 193, the blind end of which is mounted on the end portion 194 of the transverse frame member 189 as shown at 195. Thus by actuation of the piston-cylinder assembly 193, the projections 190 and 191 may be rotated to provide a bayonet lock in a manner identical to that shown at 140. Of course, each of the projections extending from the rim inflating assemblies is provided with suitable air seals such that when such assemblies are brought together they will form a completely airtight chamber within the enclosed tire.

The end portion 194 of the lower transverse frame 189 has an enlarged tubular portion having bearings 196 and 197 to enable such transverse frame member freely to slide along the guide 126. (Note FIG. 5.) Like the top and intermediate transverse frame members, the lower transverse frame member 189 includes two transverse structural channel-shaped members 198 and 199 thus to provide a completely rigid transverse structure. The opposite end of the frame member 189 is provided with a similar enlarged portion 200 enclosing the guide 125 so that such may freely ride therealong. (Note FIG. 10.)

As will be seen from a comparison of FIGS. 5 and 9, each of the end portions 194 and 200 is provided with mounts for three sheaves, the end portion 194 having sheaves 201, 202 and 203 thereon which are freely rotatable. The chain 163 is trained about the bottom of sheave 203 and over the top of sheave 202 and thence around the bottom of sheave 201 to be adjustably attached at 167 to portion 168 of the transverse frame member 143. The member 200 is also provided with mountings 204, 205 and 206 similarly to provide three sheaves such that the chain 162 will pass therearound in a manner identical to the sheaves 201, 202 and 203 mounted on the end portion 194.

The bottom transverse frame member is interconnected with the intermediate transverse frame member by means of pneumatic piston-cylinder assembly 210, the blind end of which is pivoted as shown at 211 to the bottom frame 189. The rod 212 is secured at 213 to a plate 214 projecting above the intermediate frame 143 with the rod 212 passing between the channel frame members 144 and 145. In this manner, when the piston-cylinder assembly 210 is retracted, the rod end will assume the position shown in dotted lines at 215. Of course, such retraction of the cylinder will bring the transverse frame member 189 upwardly to bring the inflating rim assemblies thereon in mating engagement with the downwardly facing inflating rim assemblies on the intermediate transverse frame member 143.

It can now be seen that the top transverse frame member 128 is stationary and mounts thereon inflating rim assemblies 130 and 131; that the intermediate transverse frame member is movable along the guides 125 and 126 by means of the chain drives 162 and 163; and that the lower transverse frame member 189 is movable with respect to and, of course, with the intermediate transverse frame member 143 by means of the piston-cylinder assembly 210. The sheaves on the ends of such lower frame member 189 permit relative movement of the intermediate and lower frame members without affecting the position of the intermediate frame member. Thus the lower and intermediate frame members may be moved as a unit by means of the chain drives or the lower frame member 189 may be moved with respect to the intermediate frame member 143 by means of the piston-cylinder assembly 210.

In order to provide an extension for the conveyor 25 leading from the tire curing press as shown in FIG. 1 with the conveyor rollers 26 guiding the heated tire from such press, there is provided two conveyor sections, one for the upper pairs of mating rim inflation devices and also one for the lower pairs of rim inflation devices.

Rigidly secured to the top transverse frame member 128, there is provided a series of depending brackets 220 and 221 having guide stops 222 and 223 respectively thereon. Such guide stops fit within elongated slots on upstanding guide members 224 and 225 respectively. These series of vertically extending guide members 224 and 225 are fixed to side frame members 226, 227, 228 and 229, with the conveyor rollers 230 being secured between the side frame members 226 and 227 and the conveyor rollers 231 being secured between the side members 228 and 229. Such conveyor rollers serve to support the tire coming from the tire curing press in the same manner as the conveyor rollers 100 in the FIG. 1 embodiment. The side frame members 226 through 229 inclusive are supported on the intermediate transverse frame member 143 and will move upwardly and downwardly therewith to the extent of the elongated slots in the upstanding members 224 and 225. As the central transverse frame member 143 moves downwardly as the result of the actuation of the chain drives 162 and 163, the top portions 233 and 234 of the slots of the guides 224 and 225 respectively will contact the stops 222 and 223 to position the conveyor rollers 230 and 231 at the proper position opposite the conveyor roller 26 to receive a tire coming from the tire curing press. At this point, however, the central transverse frame member 143 will have moved further downwardly such that the stops 222 and 223 will, in effect, lift the frame members 226 through 229 inclusive off the central transverse frame member such that a tire rolling thereon will clear the rim inflating assemblies 141 and 142.

Brackets 240 and 241 secured to the central transverse frame member 143 similarly mount thereon guide stops 242 fitted within elongated slots 243 in vertically extending guide members 244. Such guide members are secured at their bottoms to conveyor side frame members 245, 246, 247 and 248. Positioned intermediate the frame members 245 and 246 are conveyor rollers 249 and between the side frame members 247 and 248, conveyor rollers 250. Thus the conveyor rollers 249 and 250 are mounted for limited vertical movement with respect to the central transverse frame member 143, the limit of this movement being the extent of slots 243. The movement of the rollers 249 and 250 is caused by the actuation of piston-cylinder assembly 210 moving the lower transverse frame member 189 upwardly to contact the side frame members 245 through 248 inclusive thus to move the conveyor rollers upwardly with respect to the intermediate frame member 143. In the full line position shown in FIG. 5, the conveyor rollers 250 are in position to constitute a continuation of the discharge conevyor of the tire curing press.

As seen in FIG. 5, mounted transversely of the upright members 115 and 116 is a shaft 260 having a crank 261 secured thereto. Such crank is pivotally connected as at 262 to the piston 263 of piston-cylinder assembly 264. The blind end of this piston-cylinder assembly is secured to the upright member 116 as shown at 265. Also secured to the shaft 260 is a depending bracket 266 which mounts thereon stop abutments 267 positioned such that hot tires coming from the tire curing press and rolling down the discharge conveyor will contact the same to be halted and centered in a position such that the rim inflation devices may be actuated to seal such tire for post inflation. The actuation of piston-cylinder assembly 264 will rotate the shaft 260 thus to swing the stops 267 clear of a tire after such has been discharged from the rim inflating devices such that the tire may continue on its way down the discharge conveyor to storage, etc.

THE BEAD RING STRUCTURES
(FIGS. 11, 12 AND 13)

As seen in FIGS. 11 and 12, the bead portion of the inflating assemblies may be bolted directly to such assemblies through bolt holes 270. Each of the rim devices has a tire bead-engaging flange 271 and is provided with a series of upstanding frusto-conically shaped guides 272 which serve to guide and center the tire when such bead rim devices are brought together thus automatically properly to seat the tire beads against the flanges 271. Intermediate such frusto-conically shaped guides 272, there is provided a beveled surface as shown at 273 such that the bead rim devices may seat together in the manner shown in dotted lines in FIG. 11 at 274.

Referring now to the bead ring embodiment shown in FIG. 13, it may be seen that the bead engaging flange 275 may be provided with an offset shoulder 276 such that tires of 15" diameter may seat on the outer portion 277 whereas, for example, 14" tires may seat at 278. Thus tires of different sizes may be accommodated by the single bead ring structures shown in the FIG. 13 embodiment.

Operation

Figure 6:
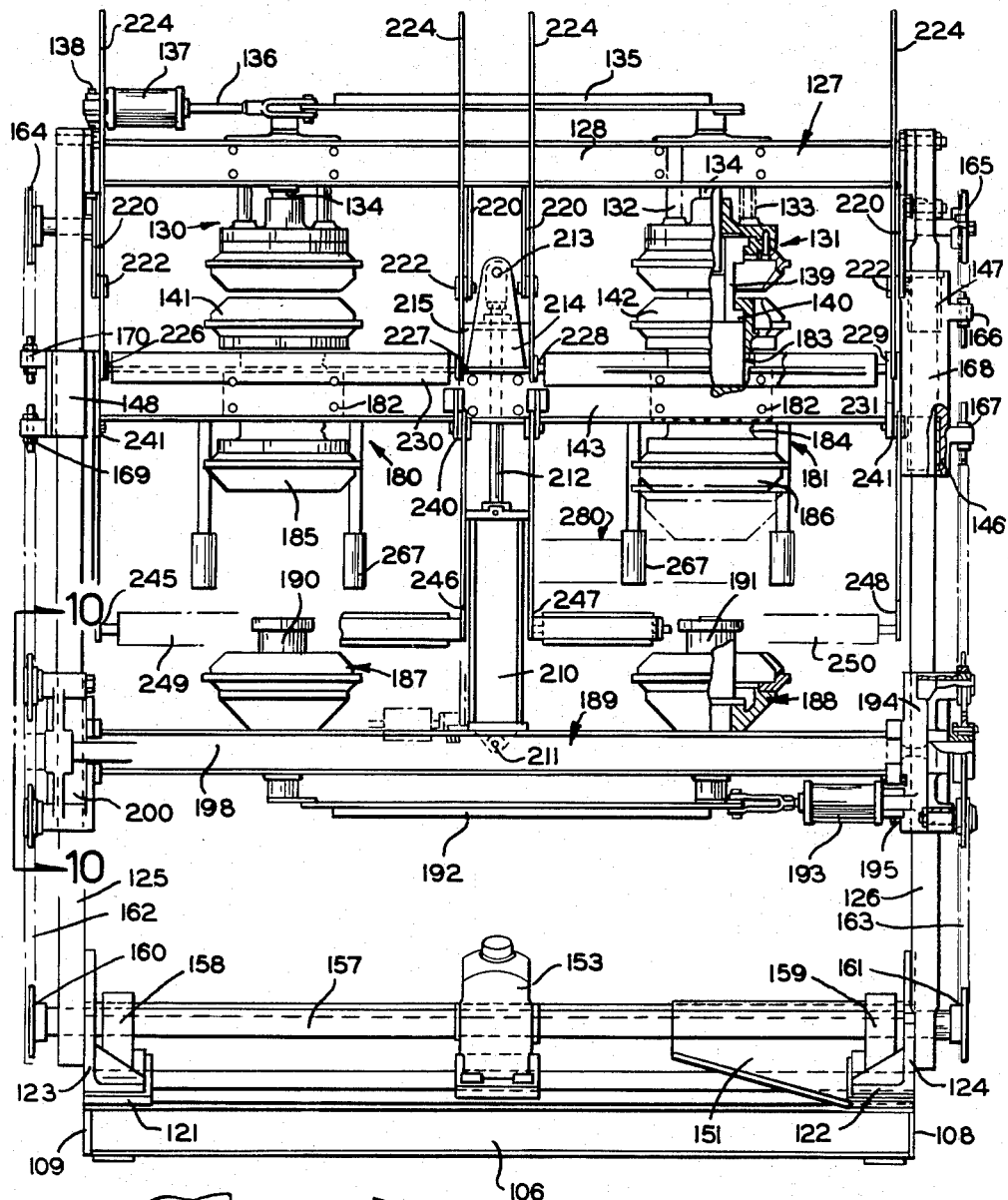
FIG. 6 is an end elevation of the embodiment shown in FIG. 5 as seen from the right thereof along the conveyor.
Figure 7:
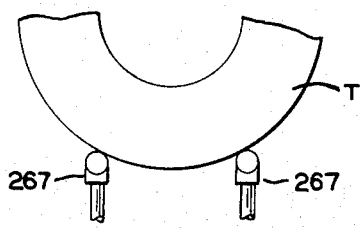
FIG. 7 is a fragmentary top plan view illustrating the position of a tire engaging the stops in the FIG. 5 embodiment.

Referring now to the operation of the preferred embodiment of the post inflator illustrated in FIGS. 5 through 10 inclusive, and with special reference to FIGS. 5 and 6, tires coming from the tire curing press on conveyor rollers 26 will roll onto the conveyor rollers 249 and 250 respectively to be stopped by the removable stops 267 and be substantially centered above the rim inflating assemblies 187 and 188. A suitable limit switch may then actuate the valve controlling pneumatic cylinder 210 to retract the same thus to raise the lower transverse frame 189 to cause the rim inflating assemblies 187 and 188 to lift the tires off the rollers 249 and 250. The bead rings on the rim inflating assemblies having a frusto-conical shape will automatically center the tires with respect thereto and the retraction of the cylinder 210 will raise the lower transverse frame 189 to the dotted line position shown at 280 in FIGS. 5 and 6. Once the projections 190 and 191 are within the hollow center portions of the rim inflating assemblies 180 and 181, the actuation of piston-cylinder assembly 193 will cause the rotation of such projections to provide the bayonet lock therewith. The hot tires that have just come from the tire curing press are now secured between the rim inflating assemblies of the intermediate and lower transverse frame members. As shown in FIG. 6, the bead rings will seat as shown at 273 in FIG. 11 to bring the tire beads fairly close together to provide the proper tensioning of the tread portion while the same may then be subjected to air under pressure through opening 184 to maintain such proper tensioning.

The rings in the illustrated FIG. 6 example enter the tire and compress such that the distance therebetween is approximately 1⅝" completely sealing the tire against air leak. When the tire is inflated, one of the two mating rings will retract to space the rings approximately 5" apart. The bayonet lock, of course, allows for this movement which is approximately 3⅜" so that the tires will be inflated with the rims spaced approximately 5" apart as measured from the outer parts of the beads. The springs 133 in the FIG. 6 embodiment hold the top bead ring in downward pressing position to compress the bead on the tires to the above-mentioned approximate 1⅝" and then as the tire is inflated, these springs will compress to allow the beads to expand to the nominal rim size or about 5" in width. It will, however, be seen that the bottom bead ring assemblies 187 and 188 are not mounted with such springs 133 as are the top bead structures since the cylinder 210 will give these bottom rings the required floating action that the springs 133 give to the top bead ring structures. However, it will be understood that, if desired, such springs may also be provided on the bottom rims.

Shortly prior to the end of the next cycle of the tire curing press, the piston-cylinder assembly 137 will be actuated to release the bayonet locks as shown at 140 in FIG. 6 such that the upper rim inflating assemblies on the intermediate transverse frame 143 may be moved away from the stationary or fixed rim inflating assemblies on the top transverse frame member. This is accomplished by actuation of the motor 150 to rotate shaft 157 to move the intermediate frame 143 downwardly and also, of course, the lower transverse frame therewith as a unit. The lowering of the intermediate frame 143 will cause the conveyor side frames 226 through 229 inclusive to drop therewith until the top of the slides or guides 224 and 225 contact the stops 222 and 223 thus effectually to raise the conveyor rollers 230 and 231 above the bead rings 141 and 142. The conveyor rollers 230 and 231 will then be positioned opposite the conveyor roller 226. It is noted that the piston-cylinder assembly 264 may be actuated to remove the stops 267 from the path of the lowering conveyor rollers 230 and 231. The cylinder will now be actuated to replace the stops 267 in the proper position to hold the next tires coming down the conveyor rollers 26 from the tire curing press.

A disc type brake 281 may be actuated simultaneously with the deenergization of the motor 150 thus to provide an accurate placement of the transverse frame member in response to the motor controls. In the lowermost position of the intermediate frame member, the lower frame member 189 will assume the dotted line position shown at 282 in FIG. 5.

As the next pair of tires comes from the dual tire press, they will roll down the discharge ramp onto the conveyor rollers 230 and 231 respectively to be halted by the stops 267. Once both tires have reached the proper position, a suitable limit switch will then energize motor 150 in a reverse direction to raise the transverse intermediate frame member 143 and, of course, the lower transverse frame member 189 holding two tires therebetween by retraction of piston-cylinder assembly 210. The frame members will continue upwardly with the bead rings 141 and 142 automatically centering the tire to be clamped between the assemblies on the upper and intermediate transverse frames. Continued upward movement of the intermediate frame member 143 will pick up the lost motion mounted conveyor rollers 230 and 231 until the entire unit is positioned substantially as shown in FIG. 6 with the lower transverse frame in the dotted line position shown at 280. Air under pressure may then be supplied through openings 183. In this manner, there will be four tires in the dual post inflation device subjected to air under pressure cooling at ambient temperature. After the upper and intermediate frame members are in the proper relative position, the piston-cylinder assembly 137 will be actuated to provide the bayonet lock therebetween.

Shortly prior to the end of the next cycle of the tire curing press, the piston-cylinder assembly 193 will be actuated to unlock the projections 190 and 191 and the piston-cylinder assembly 210 will be actuated to extend the rod 212 to lower the rim inflating assemblies 187 and 188 from the dotted line position shown at 280. The conveyor roller side frame members 245 through 248 inclusive will be raised off the lower frame member 189 as the result of the stops 242 engaging the tops of the slots 243 to position the rollers 249 and 250 opposite the discharge ramp roller 26. The raising of the rollers 249 and 250 with respect to the rim inflating assemblies 187 and 188 will automatically lift the tire thereon above the projections 190 and 191 and the piston-cylinder assembly 264 having been extended to remove the stops 267 from the path of the tires, such now cooled tires will roll freely from the dual post inflation device.

Again, retraction of the piston-cylinder assembly 264 will properly position the stops 267 to engage the next tires coming from the tire curing press such that the cycle just described may be repeated.

It will now be seen that there is provided a tire rim assembly for use with post inflators which will cool the hot tires which will still be vulcanizing somewhat after coming from the tire curing press at ambient temperature while yet maintaining such cords therein under tension to preclude the deleterious affects resulting when such nylon or like cords are not subjected to tension while cooling. Such rim assemblies provide better centering and seating of the tires and thus a more reliable post inflation unit.

Other modes of applying the principle of the invention may be employed, change being made as regards the details described, provided the features stated in any of the following claims or the equivalent of such be employed.

What is claimed is:

1. A tire bead engaging rim assembly for use in a post inflator comprising two oppositely disposed interlocking rim constructions, each rim construction comprising an outwardly projecting annular tire bead engaging flange portion forming a tire bead seating shoulder and a plurality of circumferentially spaced apart guide portions, recesses of substantial depth between each guide portion of slightly greater circumferential extent than said guide portions, each guide portion extending axially and inwardly from the top of said tire bead seating shoulder to provide guide means for directing a tire bead into contact with the respective tire bead engaging annular flange portion, said guide portions on the respective oppositely disposed rim constructions being circumferentially offset with the guide portions of one rim being axially aligned with such recesses on the opposite rim whereby said flange portions may be moved substantially adjacent each other with said guide portions of the respective rim constructions closely and substantially continuously interfitting between each other in such recesses of the opposed rim.

2. A tire bead engaging rim assembly for use in a post inflator comprising two oppositely disposed interfitting rim constructions, each rim construction comprising a tire bead engaging annular flange projecting radially outwardly from an axially extending shoulder portion forming an annular tire bead seat, a plurality of guide portions extending axially and radially inwardly from said shoulder portion to provide guide means for directing a tire bead into contact with said tire bead engaging annular flange, recesses of substantial depth between said guide portions and of slightly greater circumferential extent than said guide portions including outer surfaces which extend axially in the opposite direction as said guide portions and radially inwardly from said shoulder, said guide portions on one rim construction being axially aligned with the recesses on the other whereby the guide portions on the respective rim constructions will substantially continuously interfit and the respective flange portions may be moved substantially adjacent each other.

3. A tire bead engaging rim assembly as set forth in claim 2 including lock means to hold said rim constructions together, said lock means comprising rotatable projections on one said rim construction adapted to engage and lock the other said rim construction thereto while nevertheless permitting relative axial movement between said opposed rim constructions.

4. A tire bead engaging rim for use in a post inflator comprising a radially outwardly projecting tire bead engaging annular flange, a plurality of centering and guide portions extending axially and radially inwardly from said annular flange providing an inclined guide surface for directing a tire bead into contact with said tire bead engaging annular flange, and a plurality of circumferentially spaced recesses of substantial depth between said centering and guide portions and of slightly greater circumferential extent than said guide portions having outer surfaces extending axially and radially outwardly whereby said centering and guide portions will closely and substantially continuously interfit with the centering and guide portions of an opposed rim of like configuration for sealing and inflating a tire therebetween.

References Cited by the Examiner

UNITED STATES PATENTS

| | | | |
|---|---|---|---|
| 2,812,547 | 11/1957 | Duerksen et al. | 18—18 |
| 2,870,482 | 1/1859 | Eriksen | 18—18 |
| 2,978,741 | 4/1961 | Soderquist | 18—2 |
| 3,065,499 | 11/1962 | Brundage et al. | 18—2 |

J. SPENCER OVERHOLSER, *Primary Examiner.*

MICHAEL V. BRINDISI, WILLIAM J. STEPHENSON,
*Examiners.*